(12) United States Patent
Glatfelter

(10) Patent No.: US 10,557,661 B2
(45) Date of Patent: Feb. 11, 2020

(54) FREEZESTAT ASSEMBLY

(71) Applicant: Johnson Controls Technology Company, Milwaukee, WI (US)

(72) Inventor: Keith L. Glatfelter, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 175 days.

(21) Appl. No.: 15/710,543

(22) Filed: Sep. 20, 2017

(65) Prior Publication Data

US 2018/0094847 A1    Apr. 5, 2018

Related U.S. Application Data

(60) Provisional application No. 62/404,659, filed on Oct. 5, 2016.

(51) Int. Cl.
| | | |
|---|---|---|
| *F25D 21/00* | (2006.01) | |
| *F25D 21/04* | (2006.01) | |
| *F24D 19/00* | (2006.01) | |
| *F25B 49/00* | (2006.01) | |
| *F25B 49/02* | (2006.01) | |

(52) U.S. Cl.
CPC .......... *F25D 21/04* (2013.01); *F24D 19/0095* (2013.01); *F25B 49/005* (2013.01); *F25B 49/022* (2013.01); *F25B 2600/0251* (2013.01); *F25B 2600/21* (2013.01); *F25B 2700/2117* (2013.01)

(58) Field of Classification Search
CPC ............... F25B 49/005; F25B 2700/11; F25B 2700/111; F25B 2700/21171; F25B 2700/21172; F25B 2700/21173; F25B 47/02; F25B 47/006; F25B 2347/02; F25B 2347/023; F24D 19/0095; F24D 19/0209; F24D 19/02; F25D 29/005; F25D 2700/10; F25D 2700/11; F25D 2700/111; F25D 21/04; F28F 9/013
See application file for complete search history.

(56) References Cited

U.S. PATENT DOCUMENTS

| | | |
|---|---|---|
| 4,348,870 A | 9/1982 | Stein et al. |
| 6,844,805 B2 | 1/2005 | Knutson et al. |
| 8,833,384 B2 | 9/2014 | Burt |

(Continued)

OTHER PUBLICATIONS

DynamicAir Corporation Jan. 26, 2012 (http://www.dac-hvac.com/ask-rick-how-does-a-freezestat-work/) (Year: 2012).*

(Continued)

*Primary Examiner* — Henry T Crenshaw
*Assistant Examiner* — Kamran Tavakoldavani
(74) *Attorney, Agent, or Firm* — Fletcher Yoder, P.C.

(57) ABSTRACT

A system includes a freezestat assembly that includes a plurality of support brackets disposed in a linear arrangement, and a tubing configured to be disposed in a respective aperture of the each support bracket of the plurality of support brackets, where the tubing is configured to monitor a temperature of a flow of fluid through a heating, ventilating, and air conditioning (HVAC) system, and where the freezestat assembly is configured to be disposed upstream of an evaporator coil of the HVAC system and downstream of a hot water coil of the HVAC system with respect to the flow of fluid through the HVAC system.

25 Claims, 12 Drawing Sheets

(56) References Cited

U.S. PATENT DOCUMENTS

| | | | |
|---|---|---|---|
| 2009/0277606 A1* | 11/2009 | Reiss, III | F28D 7/1692 |
| | | | 165/69 |
| 2011/0220221 A1* | 9/2011 | Ball | E03C 1/042 |
| | | | 137/357 |
| 2014/0261714 A1 | 9/2014 | Burt | |
| 2015/0267953 A1 | 9/2015 | Hung et al. | |

OTHER PUBLICATIONS

DynamicAir Corporation Jan. 26, 2012 (http://www.dac-hvac.com/ask-rick-how-does-a-freezestat-work/) (Year: 2012) (Year: 2012).*

* cited by examiner

FREEZESTAT ASSEMBLY

CROSS-REFERENCE TO RELATED APPLICATIONS

This application claims priority to and the benefit of U.S. Provisional Application Ser. No. 62/404,659, filed Oct. 5, 2016, entitled "CONFINED ACCESS FREEZESTAT REPLACEMENT," which is herein incorporated by reference in its entirety for all purposes.

BACKGROUND

The present disclosure relates generally to heat exchange systems. Specifically, the present disclosure relates to a freezestat assembly for a heat exchange system.

Heating, ventilation, and air conditioning (HVAC) systems may include freezestat devices, which may be utilized to prevent freezing within one or more coils of a heat exchanger. Freezestats may monitor a temperature of a fluid flowing across the coils of the heat exchanger and shut down one or more components of the HVAC system when the temperature falls below a threshold. For example, a freezestat may include a temperature sensor and circuitry coupled to the temperature sensor, as well as to one or more operating components of the HVAC system. The temperature sensor may send feedback indicative of a temperature of the fluid flowing across a heat exchanger of the HVAC system to the circuitry. The circuitry may compare the feedback to a threshold, and when the feedback indicates that the temperature falls below the threshold, the circuitry may start and/or stop operation of the one or more components of the HVAC system.

DRAWINGS

Figure 11:
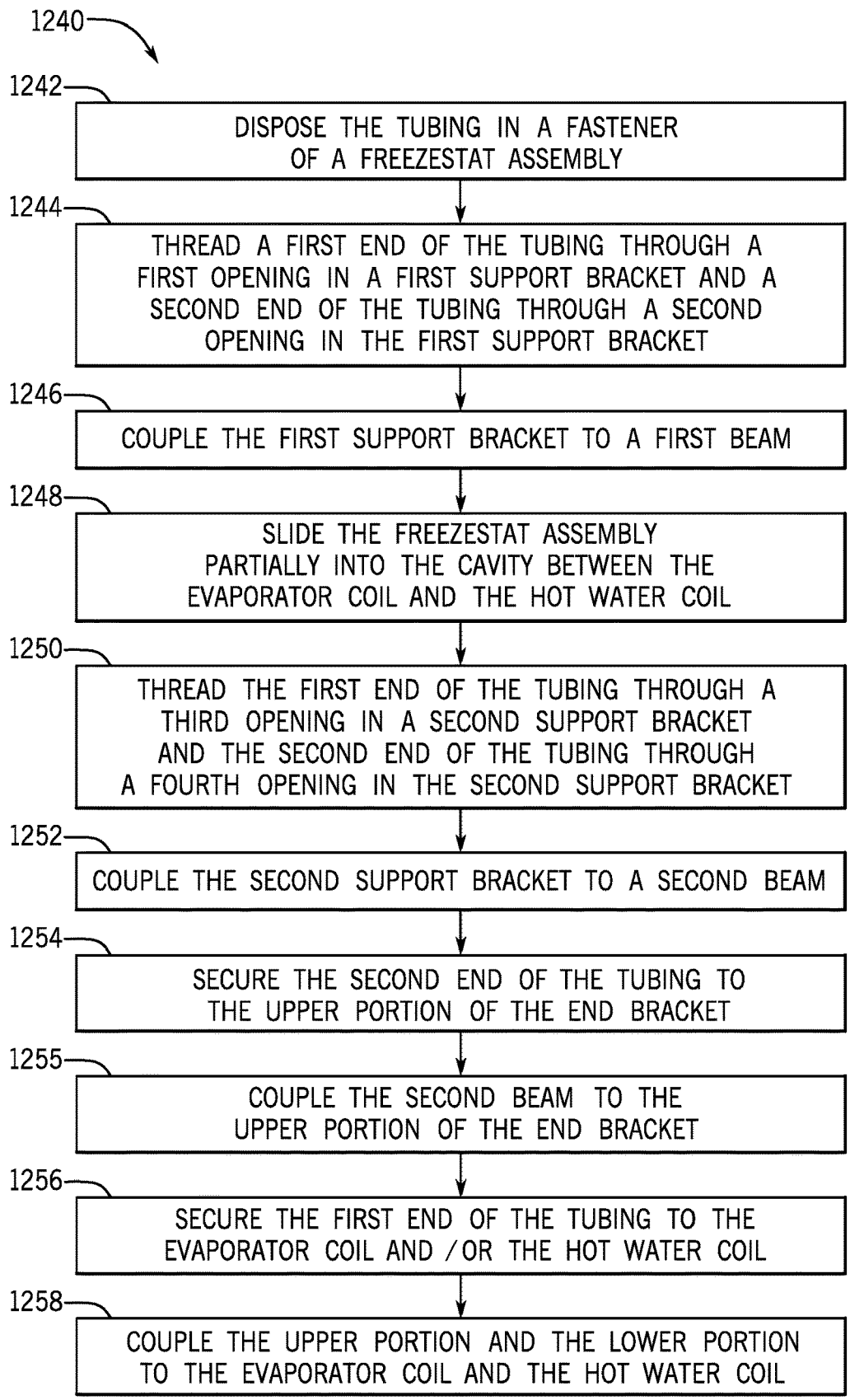
Figure 12:
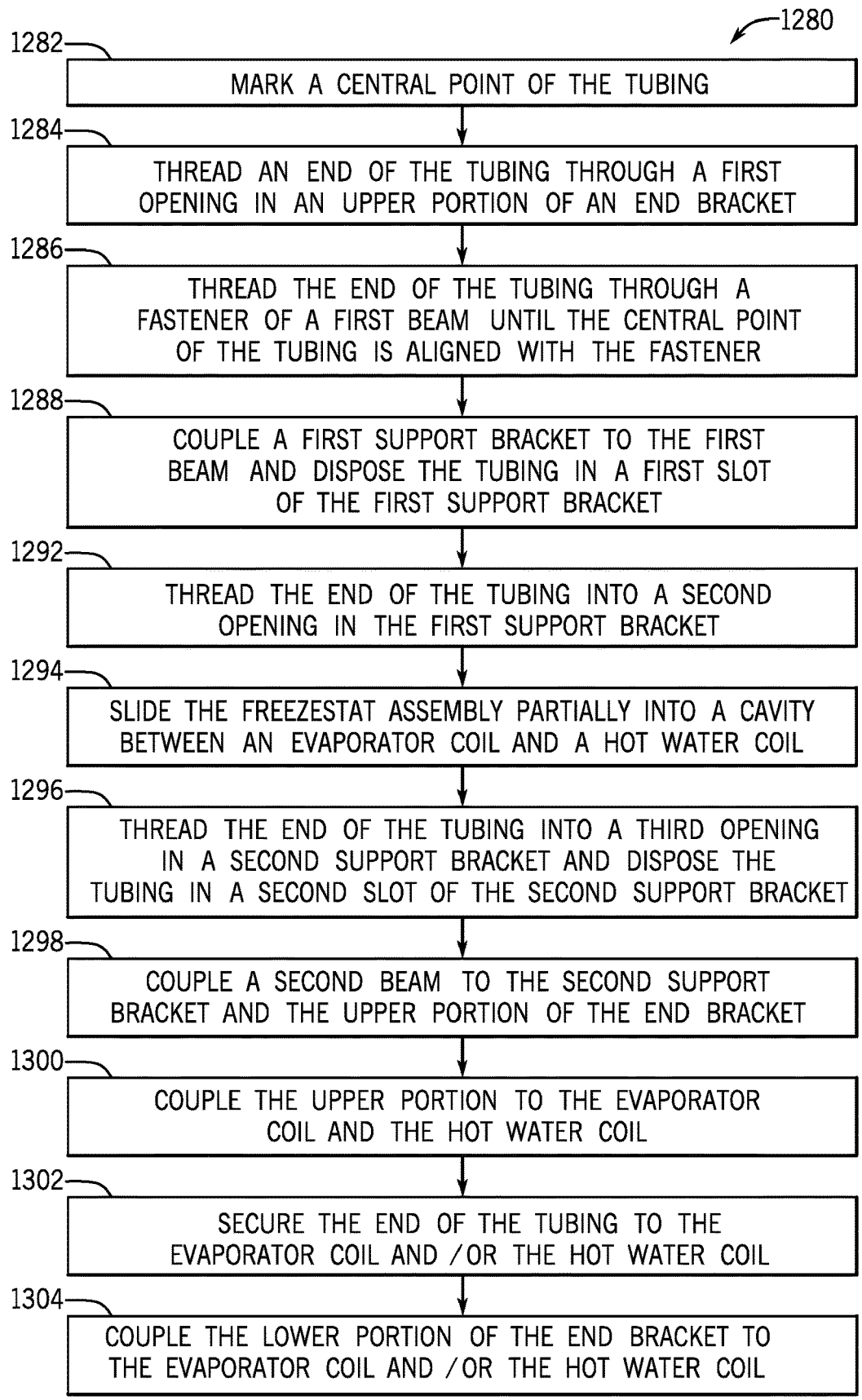

FIG. 11 is a block diagram of an embodiment of a process for installing the tubing of the freezestat assembly into a cavity between the evaporator coil and the hot water coil, in accordance with an aspect of the present disclosure; and FIG. 12 is a block diagram of an embodiment of a process for installing the tubing of the freezestat assembly into a cavity between the evaporator coil and the hot water coil, in accordance with an aspect of the present disclosure.

BRIEF SUMMARY

In one embodiment, a freezestat assembly includes a plurality of support brackets disposed in a linear arrangement, and a tubing configured to be disposed in a respective aperture of the each support bracket of the plurality of support brackets, where the tubing is configured to monitor a temperature of a flow of fluid through a heating, ventilating, and air conditioning (HVAC) system, and where the freezestat assembly is configured to be disposed upstream of an evaporator coil of the HVAC system and downstream of a hot water coil of the HVAC system with respect to the flow of fluid through the HVAC system.

In one embodiment, a heating, ventilation, and air conditioning (HVAC) unit includes an evaporator coil configured to absorb thermal energy from an air flow passing through the HVAC unit, a hot water coil disposed upstream of the evaporator coil with respect to the air flow passing through the HVAC unit, where the hot water coil is configured to transfer thermal energy to the air flow passing through the HVAC unit, and a freezestat assembly disposed upstream of the evaporator coil and downstream of the hot water coil with respect to the air flow. The freezestat assembly includes a plurality of beam sections extending in a first direction, a plurality of support brackets coupled to the plurality of beam section and extending a second direction, where the second direction is substantially perpendicular to the first direction, and a tubing disposed in respective openings of the plurality of support brackets, where the tubing is configured to monitor a temperature of the a air flow passing through the HVAC unit.

In one embodiment, a heating, ventilation, and air conditioning (HVAC) unit includes an evaporator coil configured to absorb thermal energy from a flow of fluid passing through the HVAC unit, a hot water coil disposed upstream of the evaporator coil with respect to the flow of fluid passing through the HVAC unit, where the hot water coil is configured to transfer thermal energy to the flow of fluid passing through the HVAC unit, a freezestat assembly disposed upstream of the evaporator coil and downstream of the hot water coil with respect to the flow of the fluid, where the freezestat assembly includes a plurality of support brackets disposed in a linear arrangement, and a freezestat sensor configured to be disposed in respective openings of the plurality of support brackets, where the freezestat sensor is configured to monitor a temperature of the flow of fluid passing through the HVAC unit, and a controller coupled to the freezestat sensor and configured to receive feedback indicative of the temperature of the flow of fluid passing through the HVAC unit from the freezestat sensor, wherein the controller is configured to control operation of the evaporator, the hot water coil, or both based on the feedback.

DETAILED DESCRIPTION

In some cases, heating, ventilation, and air conditioning (HVAC) systems may include a unit (e.g., a packaged indoor unit and/or outdoor unit) having multiple components. For example, the unit may include a vapor compression refrigeration system as well as one or more heat exchange devices that may operate together or separately from one another. For example, the unit may include an evaporator coil of the vapor compression refrigeration system as well as a hot water coil disposed adjacent to one another. The evaporator coil of the vapor compression refrigeration system may absorb thermal energy (e.g., heat) from a fluid (e.g., air) flowing through the unit to cool the fluid, whereas the hot water coil may transfer thermal energy (e.g., heat) to the fluid flowing through the unit to warm the fluid. Additionally, a freezestat may be disposed in the unit to monitor a temperature of the fluid flowing through the unit. As mentioned above, the freezestat may include a temperature sensor as well as circuitry that may start and/or stop one or more components of the unit when a temperature of the fluid falls below a threshold. As a non-limiting example, when the temperature of the fluid falls below the threshold, the circuitry of the freezestat may actuate the hot water coil to transfer thermal energy to the fluid and increase a temperature of the fluid. The hot water coil may be actuated until the temperature of the fluid reaches and/or exceeds the threshold.

In traditional HVAC systems, the freezestat may be disposed within the unit downstream of a filter. In order to replace the freezestat and/or perform routine maintenance on the freezestat in a traditional HVAC system, the filters are removed to gain access to the freezestat. Additionally, the freezestat may be disposed upstream of both the evaporator coil and the hot water coil outside of a housing of the unit. Unfortunately, disposing the freezestat upstream of the hot water coil may not enable the freezestat to effectively determine the temperature of the fluid upon actuation of the hot water coil and after thermal energy has been transferred to the fluid. In other words, traditional freezestats may monitor a temperature of the fluid before the fluid flows across the hot water coil and increases in temperature. Therefore, positioning the freezestat between the hot water coil and the evaporator coil may provide improved accuracy of temperature measurements of the fluid, which may lead to enhanced efficiency of the HVAC system. Further, positioning the freezestat between the hot water coil and the evaporator coil may enable access to the freezestat via an access door of the HVAC system that also provides access to the evaporator coil and/or the hot water coil.

Further, positioning the hot water coil upstream of the evaporator coil with respect to the flow of fluid through the unit may enable a capacity of the hot water coil to be increased. In traditional HVAC systems, the hot water coil may be disposed downstream of the evaporator coil with respect to the flow of the fluid through the unit. In some cases, a size of the hot water coil may be less than a size of the evaporator coil because of various tubing and/or other components disposed within the unit that are also positioned downstream of the evaporator coil. Thus, disposing the hot water coil upstream of the evaporator coil may enable a size of the hot water coil to be substantially equal to (e.g., within 10% of, within 5%, or within 1% of) the size of the evaporator coil. Further still, the size (e.g., length) of both the evaporator coil and the hot water coil may be substantially equal to (e.g., within 10% of, within 5% of, or within 1% of) the size (e.g., length) of the HVAC unit and/or a housing of the HVAC unit. As a result, packaging of the hot water coil and evaporator coil within the HVAC unit may be more economical in presently disclosed embodiments. In any case, increasing a capacity of the hot water coil may enable the HVAC system to operate more efficiently at lower ambient temperatures (e.g., when the fluid is ambient air).

Figure 1:
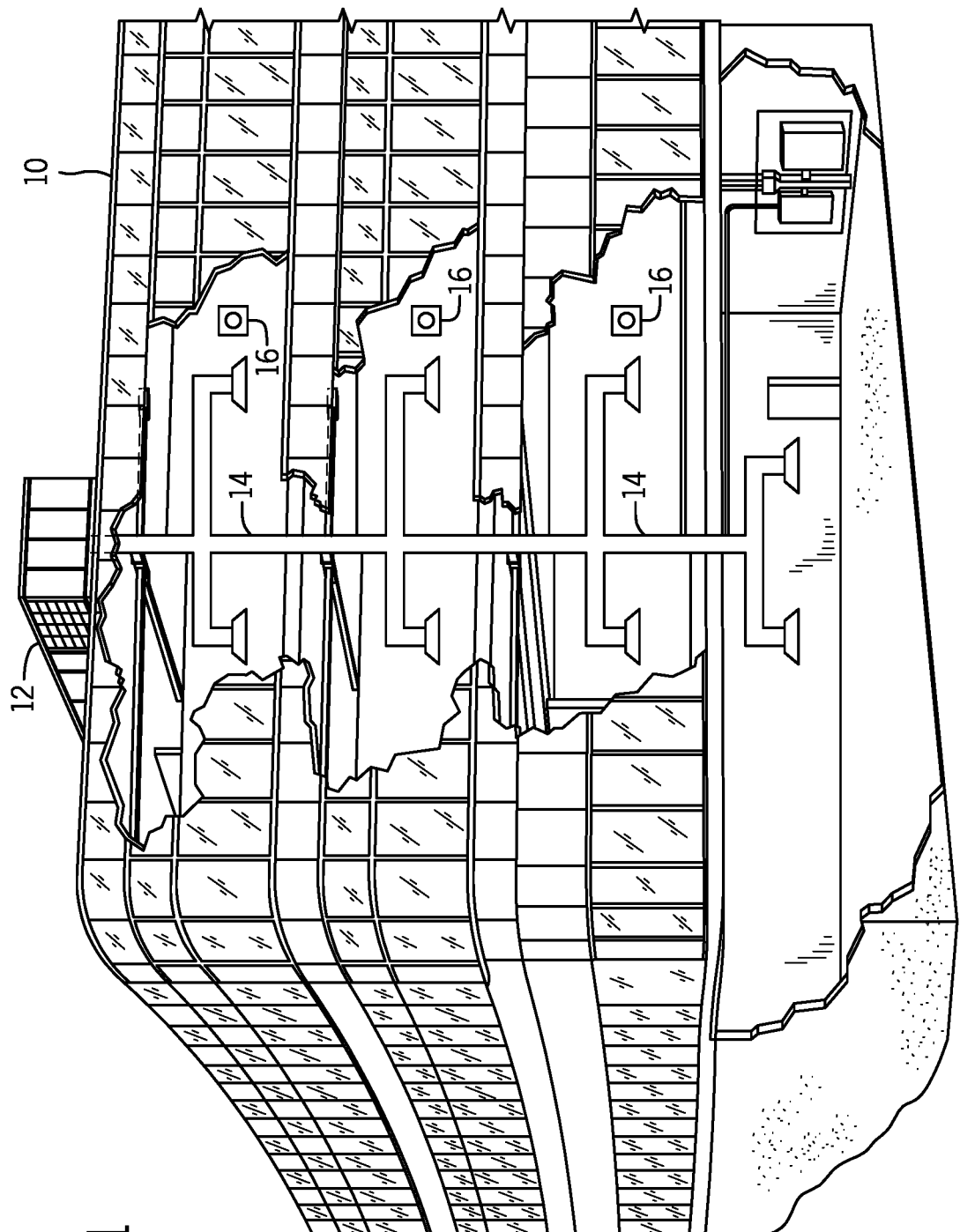
FIG. 1 is a perspective view of an embodiment of a building that may utilize a heating, ventilation, and air conditioning (HVAC) system in a commercial setting, in accordance with an aspect of the present disclosure.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building 10 with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
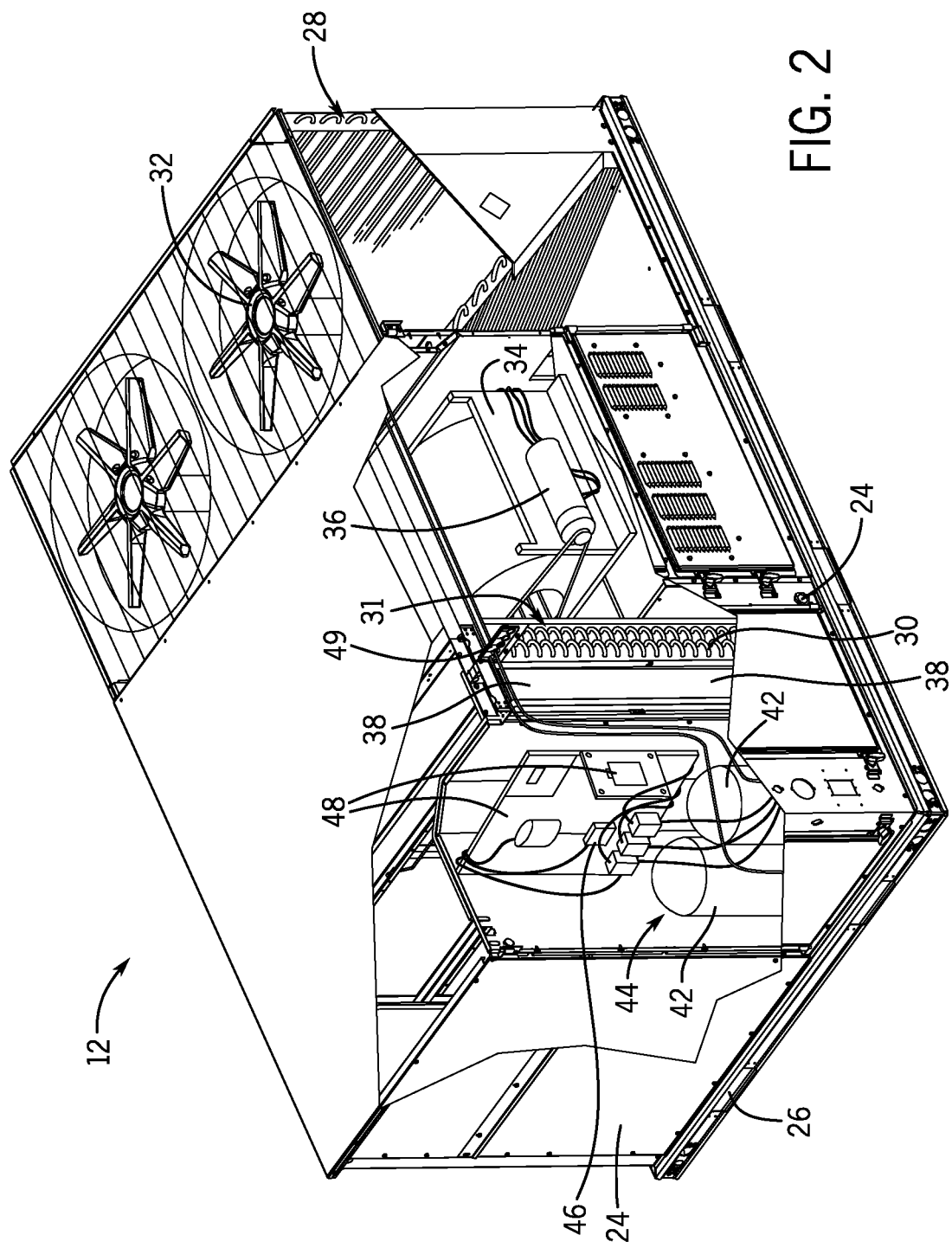
FIG. 2 is a perspective view of an embodiment of an HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant (for example, R-410A, steam, or water) through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms (one or more being referred to herein separately or collectively as the control device 16). The control circuitry may be configured to control operation of the equipment, provide alarms, and monitor safety switches. Wiring 49 may connect the control board 48 and the terminal block 46 to the equipment of the HVAC unit 12.

Figure 3:
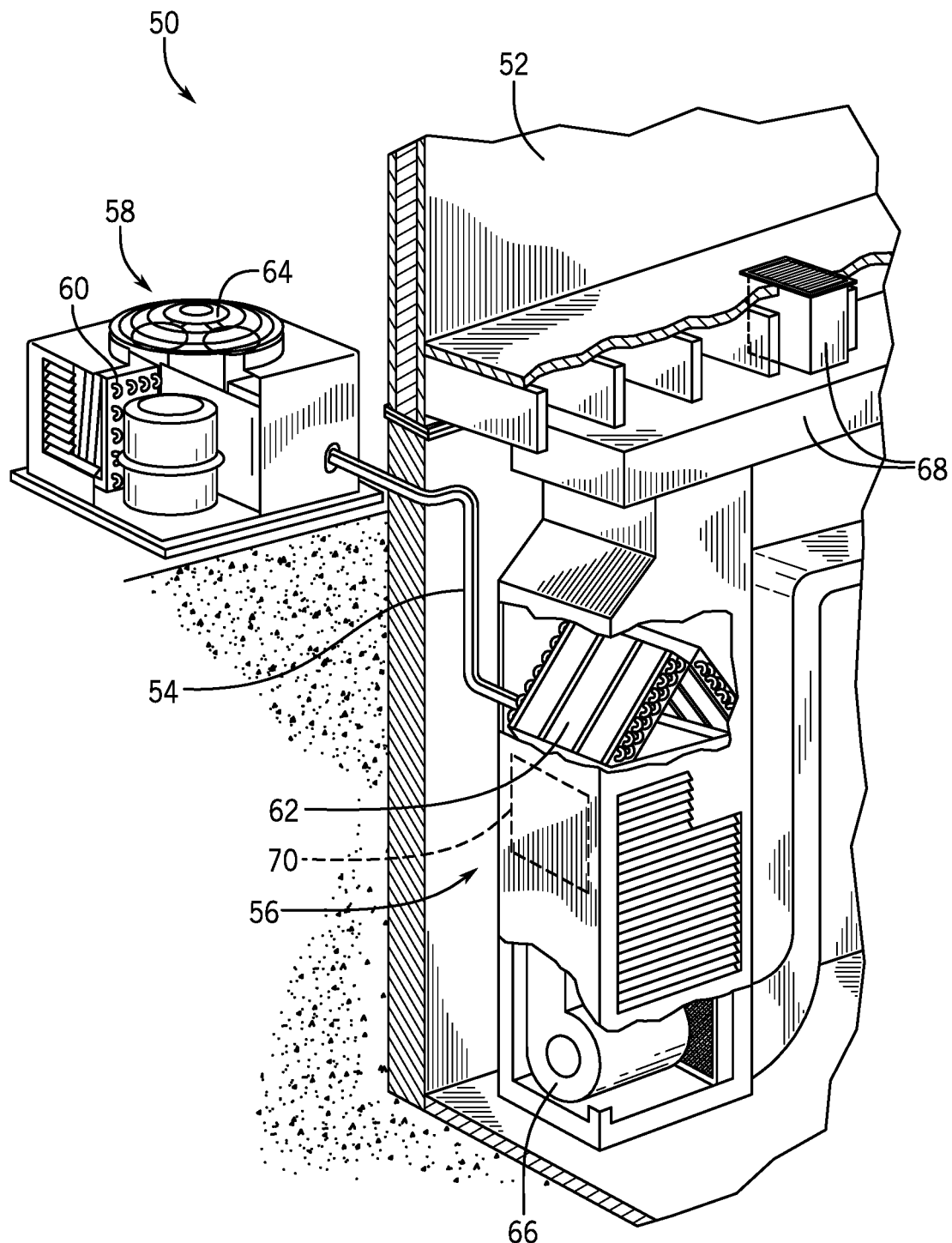
FIG. 3 is a perspective view of an embodiment of a residential, split HVAC system that includes an indoor HVAC unit and an outdoor HVAC unit, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant (which may be expanded by an expansion device, not shown) and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat (plus a small amount), the residential heating and cooling system 50 may become operative to refrigerate additional air for circulation through the residence 52. When the temperature reaches the set point (minus a small amount), the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger (that is, separate from heat exchanger 62), such that air directed by the blower 66 passes over the tubes or pipes and extracts heat from the combustion products. The heated air may then be routed from the furnace system 70 to the ductwork 68 for heating the residence 52.

Figure 4:
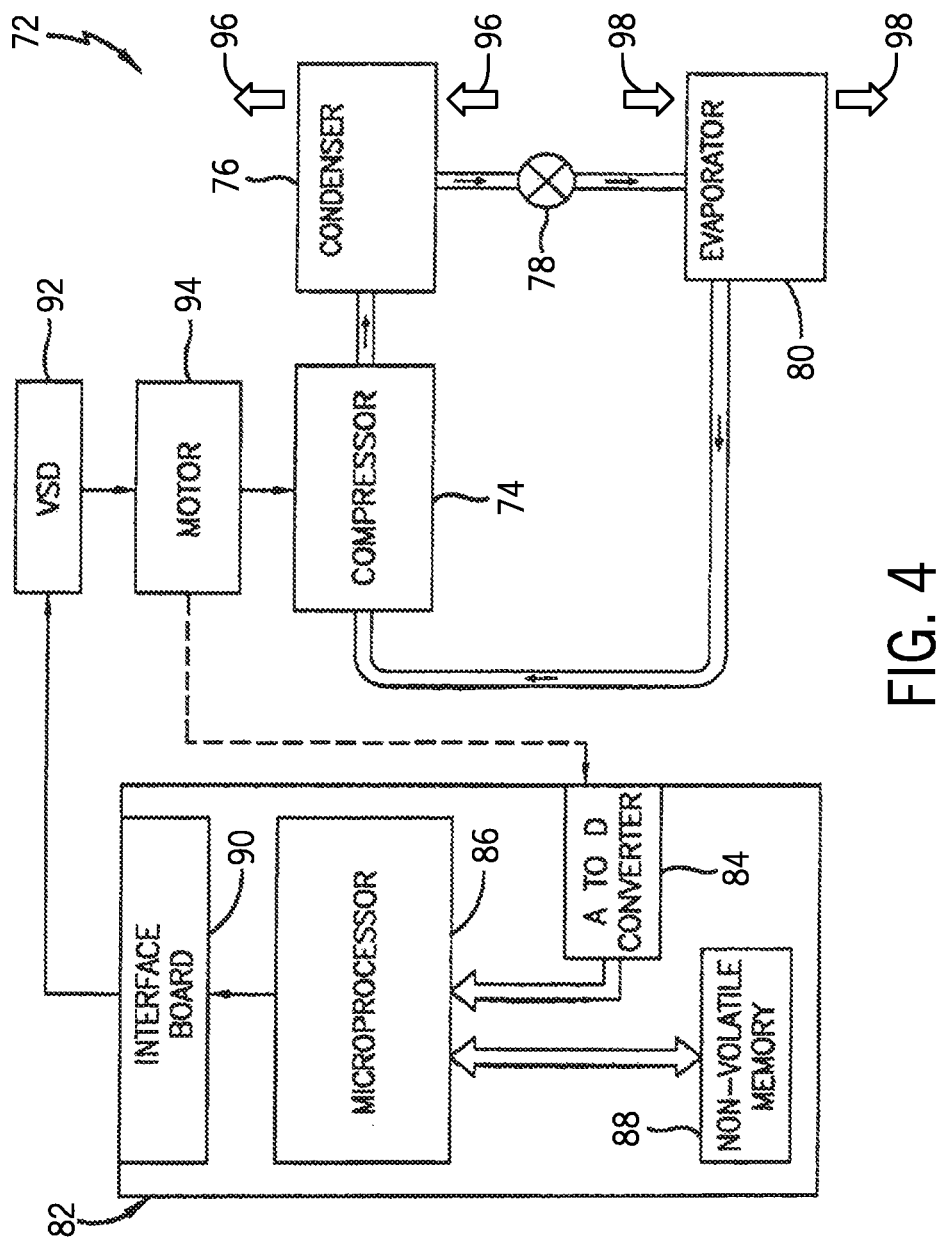
FIG. 4 is a schematic of an embodiment of the HVAC system of FIG. 1, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
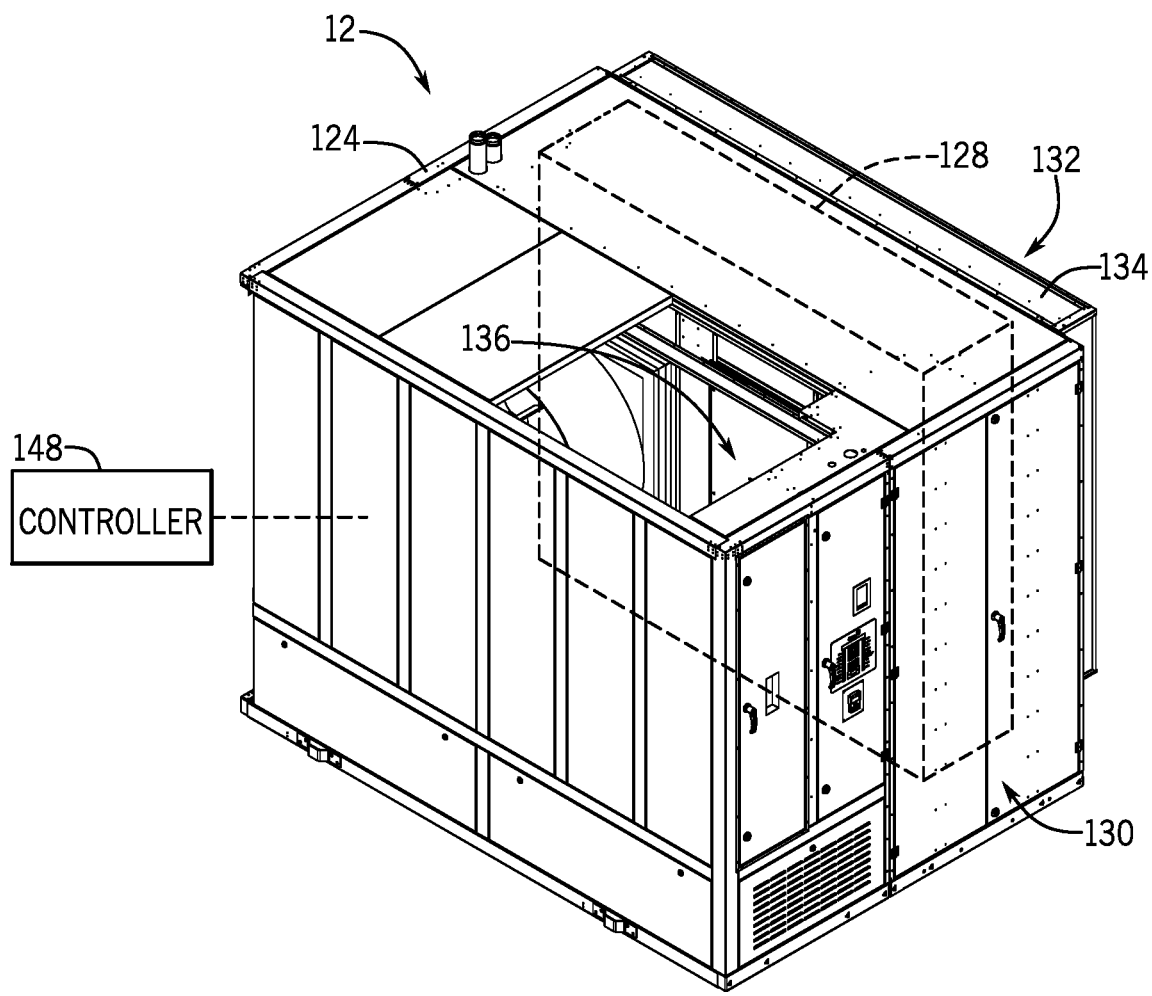
FIG. 5 is a perspective view of an embodiment of an HVAC unit of the HVAC system of FIG. 1, in accordance with an aspect of the present disclosure.

FIG. 5 is a perspective view an embodiment of the HVAC unit 12 with a portion of the external covering removed to show internal components. The HVAC unit 12 of FIG. 5 is a single package unit, and may include one or more independent refrigeration circuits and components that are tested, charged, wired, piped, and ready for installation. In other embodiments, the HVAC unit 12 may be a standalone unit that may be connected to one or more external refrigeration circuits and associated equipment. The HVAC unit 12 may provide a variety of heating and/or cooling functions, such as cooling only, heating only, cooling with electric heat, cooling with dehumidification, cooling with gas heat, or cooling with a heat pump.

As shown in the illustrated embodiment of FIG. 5, a cabinet 124 encloses the HVAC unit 12 and provides structural support and protection to the internal components from environmental and other contaminants. In some embodiments, the cabinet 124 may be constructed of galvanized steel and insulated with aluminum foil faced insulation. However, in other embodiments, the cabinet 124 may be constructed of any suitable material.

The HVAC unit 12 may include one or more heat exchangers (e.g., the heat exchangers 28 and 30 and/or a hot water coil) disposed in a coil compartment 128 of the cabinet 124. As discussed above, the one or more heat exchangers may include an evaporator coil and a hot water coil (see, e.g., FIG. 6). The hot water coil may transfer thermal energy to a fluid (e.g., the air stream) flowing through the HVAC unit 12. The heat exchangers may be disposed in the coil compartment 128 of the cabinet 124, which may be accessible via an access door 130. The fluid enters the cabinet 124 through an opening disposed on a face 132 of the cabinet 124. The fluid then flows through one or more filters 134 and ultimately through the heat exchangers in the coil compartment 128 before discharging through an opening 136 toward the ductwork 14. In accordance with embodiments of the present disclosure, a freezestat assembly may be disposed between adjacent coils (e.g., the evaporator coil and the hot water coil) of the one or more coils disposed in the coil compartment 128. Accordingly, the one or more heat exchangers may be controlled to adjust a temperature of the fluid through the cabinet 124 based on feedback from a temperature sensor (e.g., tubing) of the freezestat assembly.

The operation of the HVAC unit 12 may be governed by a controller 148. The controller 148 may include control circuitry connected to a thermostat, sensors, and alarms (e.g., the control device 16 and/or the freezestat assembly). The control circuitry may be configured to control operation of the equipment, provide alarms, and monitor safety switches. Wiring may connect the controller 148 and the terminal block to the equipment of the HVAC unit 12.

Figure 6:
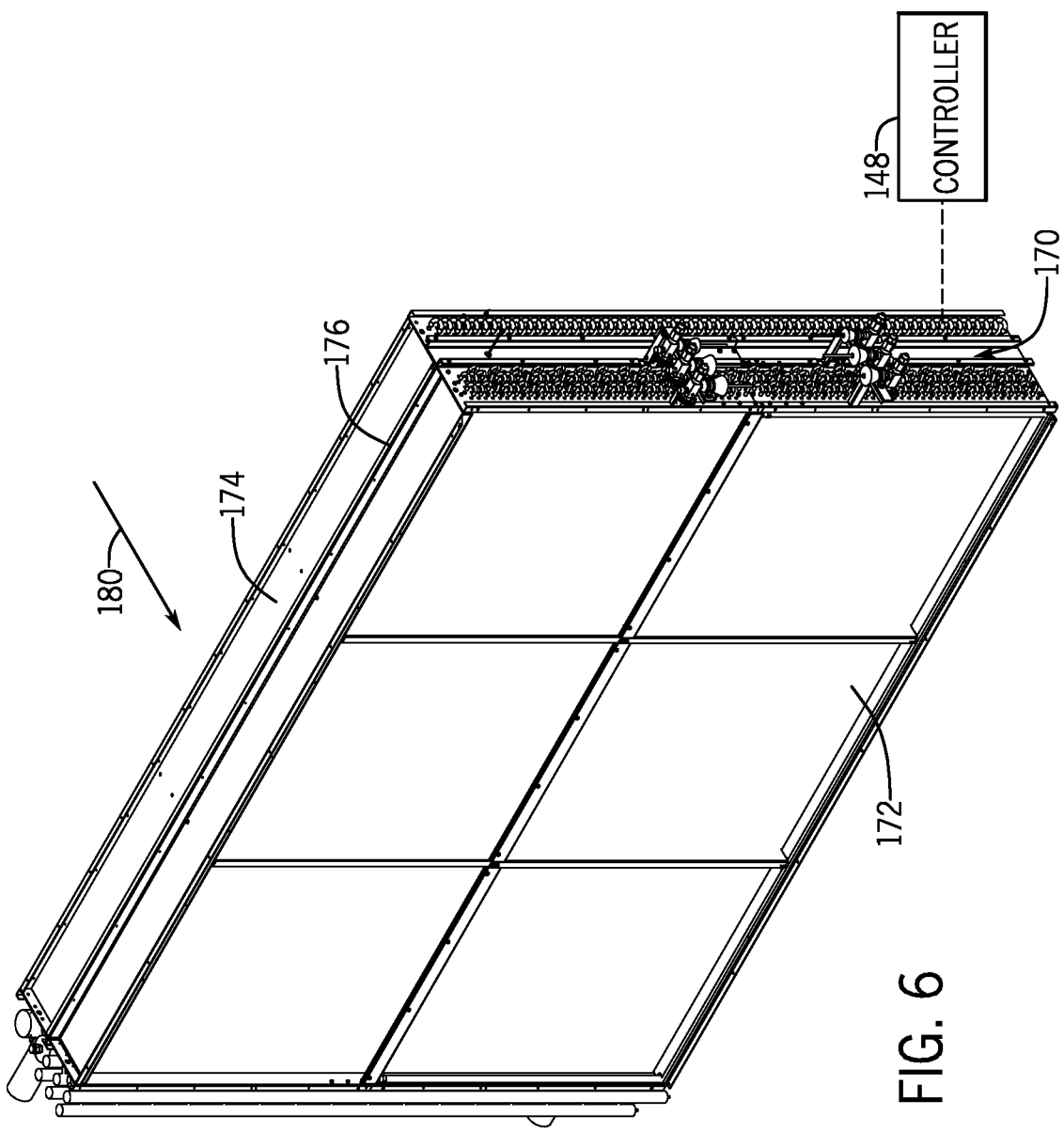
FIG. 6 is a perspective view of an embodiment of a freezestat assembly installed between an evaporator coil and a hot water coil of the HVAC unit of FIG. 5, in accordance with an aspect of the present disclosure.

As discussed above, disposing a freezestat assembly 170 between an evaporator coil 172 and a hot water coil 174 may increase a capacity of the HVAC unit 12 and/or enhance an efficiency of the HVAC unit 12. FIG. 6 is a perspective view of the freezestat assembly 170 disposed between the evaporator coil 172 and the hot water coil 174. As shown in the illustrated embodiment, the evaporator coil 172 and the hot water coil 174 is separated by a spacer 176, which forms a cavity 178 (see, e.g., FIG. 7) between the evaporator coil 172 and the hot water coil 174. In some embodiments, the freezestat assembly 170 may be disposed in the cavity 178 between the evaporator coil 172 and the hot water coil 174. Disposing the freezestat assembly 170 in between the evaporator coil 172 and the hot water coil 174 (e.g., downstream of the hot water coil 174 and upstream of the evaporator coil 172 with respect to a flow of fluid, represented by arrow 180, through the HVAC unit 12) enables the freezestat assembly 170 to monitor a temperature of the fluid flowing through the HVAC unit 12 after being heated by the hot water coil 174. For example, the controller 148, which may be a component of the freezestat assembly 170 or coupled to the freezestat assembly 170, determines that a temperature of the fluid falls below a threshold and send a signal to actuate the hot water coil 174 (e.g., actuate a valve to direct a flow of heated water through the hot water coil 174). The hot water coil 174 may transfer thermal energy to the fluid, which increases a temperature of the fluid. The freezestat assembly 170 then monitors the temperature of the fluid as the temperature of the fluid increases as a result of the heat exchange between the fluid and the hot water coil 174. Accordingly, the controller 148 may be configured to increase and/or decrease a flow rate of water through the hot water coil 174, such that the fluid reaches a target temperature (e.g., a temperature above the threshold). Further, when the temperature of the fluid reaches a second threshold, the controller 148 may be configured to stop operation of the hot water coil 174.

Figure 7:
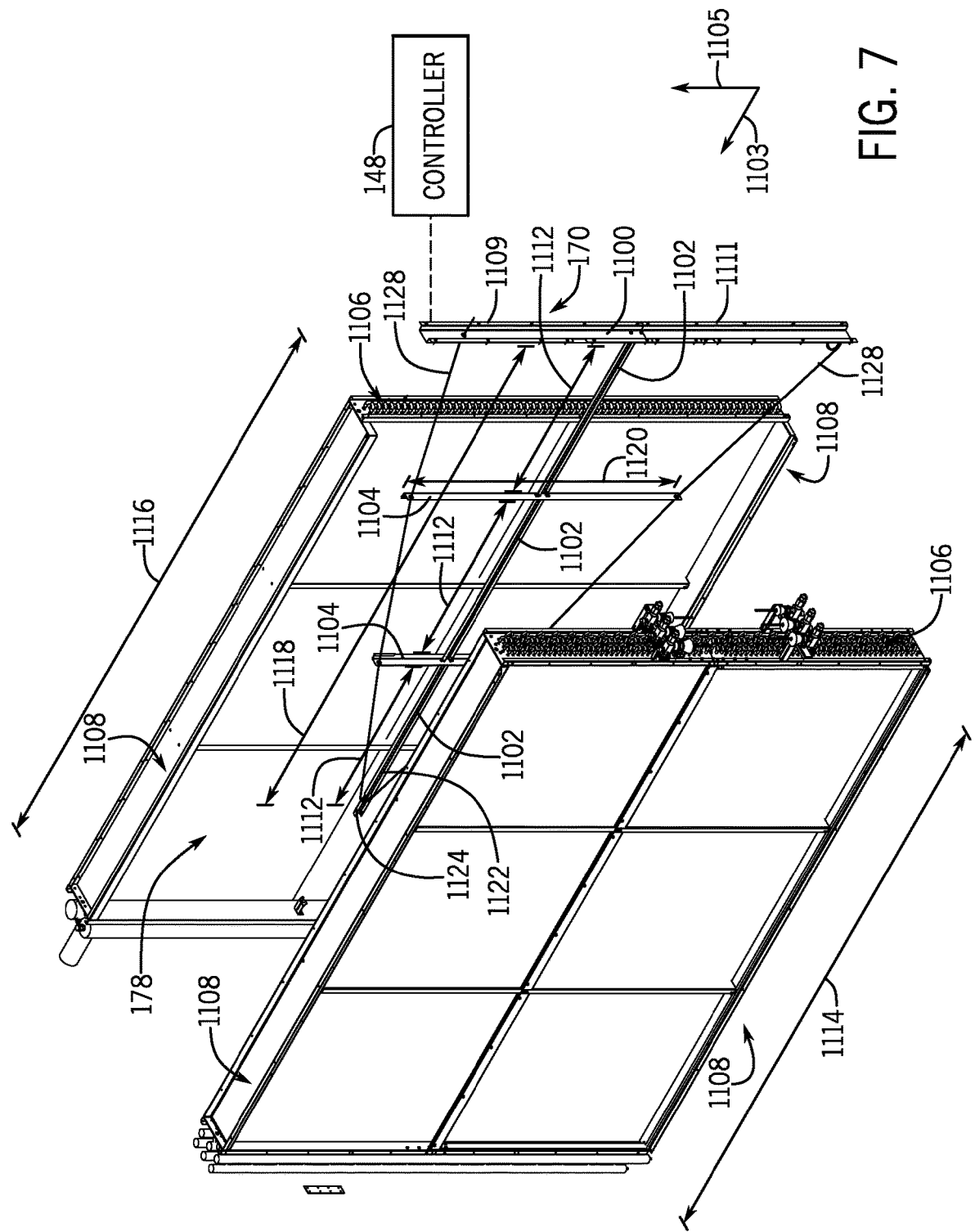
FIG. 7 is an exploded perspective view of an embodiment of the freezestat assembly between the evaporator coil and the hot water coil, in accordance with an aspect of the present disclosure.

FIG. 7 is an exploded perspective view of the evaporator coil 172, the hot water coil 174, and the freezestat assembly 170 disposed in the cavity 178 between the evaporator coil 172 and the hot water coil 174. As shown in the illustrated embodiment of FIG. 7, the freezestat assembly 170 includes an end bracket 1100 that ultimately couples the freezestat assembly 170 to both the evaporator coil 172 and the hot water coil 174. The freezestat assembly 170 also includes one or more beams 1102 (e.g., a beam having beam sections) coupled to the end bracket 1100 and/or a plurality of support brackets 1104. As shown in the illustrated embodiment of FIG. 7, the end bracket 1100 and the plurality of support brackets 1104 are positioned substantially parallel to ends 1106 of the evaporator coil 172 and the hot water coil 174. Additionally, the beams 1102 are positioned substantially parallel to upper and lower portions 1108 of the evaporator coil 172 and the hot water coil 174. In other words, the beams 1102 extend along a first axis 1103 (e.g., a first axial direction) and the plurality of support brackets 1104 (and the end bracket 1100) extend along a second axis 1105 (e.g., a second axial direction), where the second axis 1105 is substantially perpendicular to (e.g., within 20 degrees of, within 10 degrees of, of, within 5 degrees of, or within 1 degree of) the first axis 1103. In some embodiments, the end bracket 1100 may include an upper portion 1109 and a lower portion 1111. In other embodiments, the end bracket 1100 may include a single piece structure that extends along the axis 1105.

While the illustrated embodiment of FIG. 7 shows the freezestat assembly 170 having three of the beams 1102 (e.g., beam sections) and two of the support brackets 1104, it should be understood that the freezestat assembly 170 may include any suitable number of the beams 1102 (e.g., beam sections) and the support brackets 1104. In some embodiments, the beams 1102 and/or the support brackets 1104 are made from galvanized sheet metal, stainless steel, plastic, and/or another corrosion resistant material. In other embodiments, the beams 1102 and/or the support brackets 1104 may be formed from another suitable material. Further, in some embodiments, each of the beams 1102 has a uniform length 1112. The uniform length 1112 may be determined based on a length 1114 of the evaporator coil 172 and/or a length 1116 of the hot water coil 174. For example, the uniform length 1112 may be predetermined so that a total length 1118 of the freezestat assembly 170 is substantially equal to (e.g., within 10% of, within 5% of, or within 1% of) the length 1114 of the evaporator coil 172 and/or the length 1116 of the hot water coil 174. In other embodiments, the beams 1102 may have non-uniform lengths. However, the non-uniform lengths of the beams 1102 may be predetermined so that the total length 1118 of the freezestat assembly 170 is substantially equal to (e.g., within 10% of, within 5% of, or within 1% of) the length 1114 of the evaporator coil 172 and/or the length 1116 of the hot water coil 174. As discussed above, the length 1114 of the evaporator coil 172 and the length 1116 of the hot water coil 1116 may be substantially equal to (e.g., within 10% of, within 5% of, or within 1% of) a length of the HVAC unit 12 to enhance and/or increase a capacity of the HVAC unit 12. Additionally, in some embodiments, heights 1120 of the support brackets 1104 may gradually decrease along the lengths 1114, 1116 of the evaporator coil 172 and the hot water coil 174 starting from the end bracket 1100. In such embodiments, the freezestat assembly 170 has a generally triangular shape. In other embodiments, the heights 1120 of the support brackets 1104 may be uniform, such that the freezestat assembly 170 forms a generally rectangular shape. In still further embodiments, the heights 1120 of the support brackets 1104 may be configured to form another suitable shape.

In some embodiments, the beams 1102 may include an end beam 1122 that is coupled to the evaporator coil 172 and/or the hot water coil 174 via a fastener 1124 (e.g., a clip, a bracket, a screw, a bolt, and/or another suitable fastener). In some embodiments, the beams 1102 are coupled to the support brackets 1104 by a plurality of bolts, nuts, washers, and/or rivets. In other embodiments, the beams 1102 may be coupled to the support brackets 1104 using another suitable technique (e.g., one or more welds, adhesives, and/or screws).

In any case, the support brackets 1104 may include openings 1126 (see, e.g., FIG. 8) and/or apertures that are utilized to receive and support a tubing 1128 (e.g., freezestat sensor) of the freezestat assembly 170. In some embodiments, the tubing 1128 may be a temperature sensing device (e.g., a freezestat sensor) of the freezestat assembly 170 that is configured to monitor a temperature of fluid flowing between the hot water coil 174 and the evaporator coil 172.

The tubing 1128 may be threaded through the openings 1126, such that the tubing 1128 forms a shape that generally mirrors the shape of the freezestat assembly 170 (e.g., a triangular shape, a rectangular shape, or another suitable shape).

Figure 8:
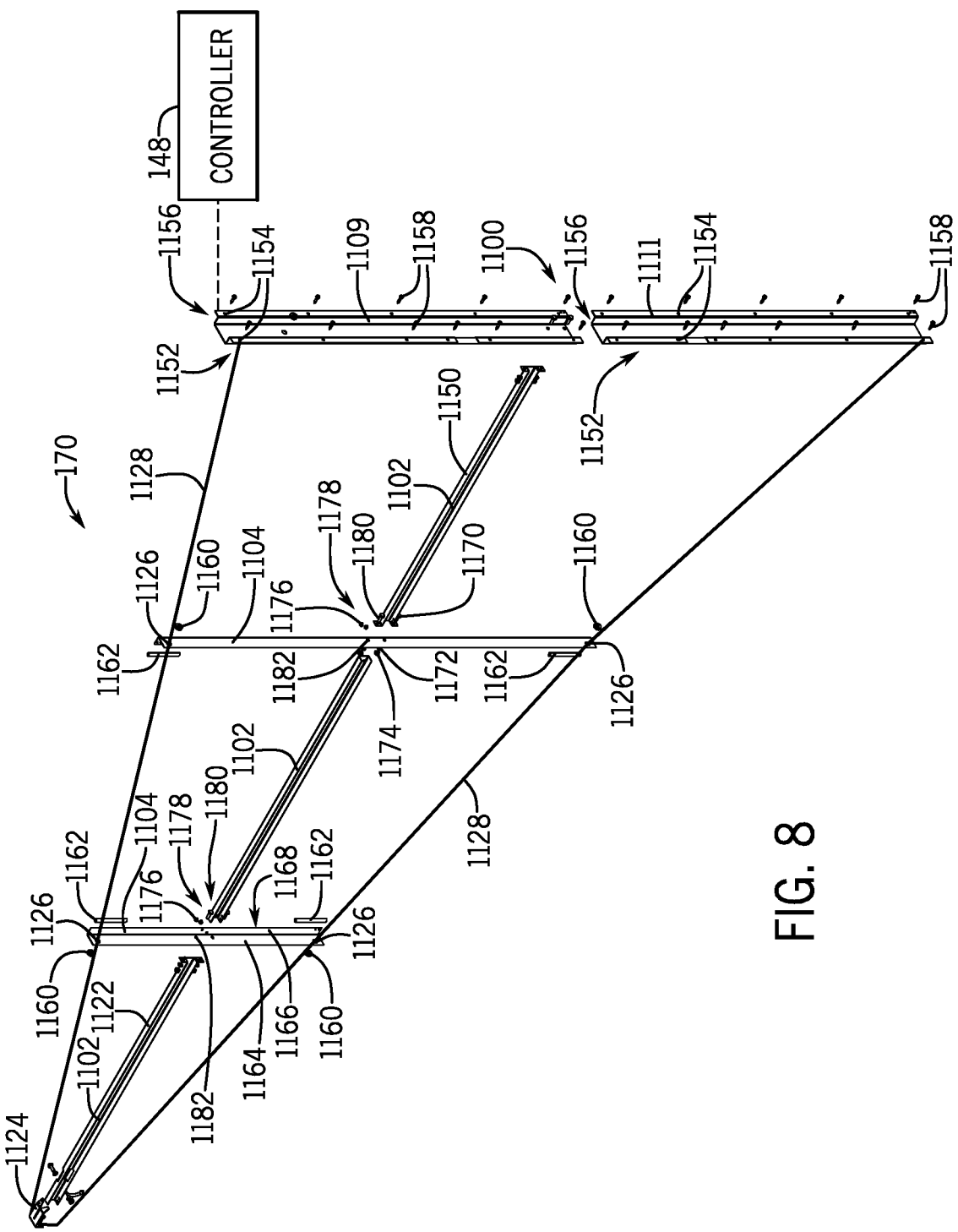
FIG. 8 is an exploded perspective view of an embodiment of the freezestat assembly of FIG. 7, in accordance with an aspect of the present disclosure.

FIG. 8 is a perspective exploded view of the freezestat assembly 170. As shown in the illustrated embodiment of FIG. 8, the end bracket 1100 of the freezestat assembly 170 includes the upper portion 1109 and the lower portion 1111. Separating the end bracket 1100 into the upper portion 1109 and the lower portion 1111 may facilitate replacement of the tubing 1128 and/or other components of the freezestat assembly 170. For example, in some embodiments, a first beam 1150 (e.g., beam section) may be coupled to the upper portion 1109, but not to the lower portion 1111, and the lower portion 1111 may be coupled to the upper portion 1109. Therefore, the lower portion 1111 may be removed from the cabinet 124 while the beams 1102, the support brackets 1104, and the tubing 1128 remain in the cavity 178. In some embodiments, the tubing 1128 may be removed from the lower portion 1111 and then sequentially removed from each of the support brackets 1104 as the freezestat assembly 170 is slid out from the cavity 178. The method of replacing the tubing 1128 and/or other components of the freezestat assembly 170 is described in detail herein with reference to FIGS. 10 and 11.

As shown in the illustrated embodiment of FIG. 8, the upper portion 1109 and the lower portion 1111 include a first column 1152 of openings 1154 and a second column 1156 of the openings 1154, which may be configured to receive one or more fasteners 1158 (e.g., screws, bolts, rivets, etc.). In some embodiments, the fasteners 1158 disposed in the first column 1152 of the openings 1154 are secured to the evaporator coil 172 and the fasteners 1158 disposed in the second column 1156 of the openings 1154 are secured to the hot water coil 174. Thus, the end bracket 1100 (e.g., both the upper portion 1109 and the lower portion 1111) may be secured to both the evaporator coil 172 and the hot water coil 172.

As discussed above, the tubing 1128 may be threaded through the openings 1126 in the support brackets 1104. In some embodiments, the openings may also receive grommets 1160 (e.g., rubber, neoprene, and/or another suitable material) that are configured to secure the tubing 1128 within the openings 1126. In other words, the grommets 1160 may generally block movement of the tubing 1128 with respect to the openings 1126 in the support brackets 1104. Further, the support brackets 1104 may include trim components 1162 disposed proximate the openings 1126. In some embodiments, the support brackets 1104 may be "L" shaped brackets that include a body 1164 and an orthogonal member 1166 that extends generally perpendicularly from the body 1164 to form the "L" shape. In some cases, the tubing 1128 may contact the orthogonal member 1166 of the support brackets 1104. Accordingly, to reduce friction and noise between the tubing 1128 and the orthogonal member 1166, the trim components 1162 may be disposed on at least a portion of an edge 1168 of the orthogonal member 1166. The trim components 1162 may thus increase an operating life of the tubing 1128 by reducing wear and/or otherwise reducing an effectiveness of the tubing 1128.

Additionally, FIG. 8 illustrates that the beams 1102 are coupled to the support brackets 1104 using a plurality of bolts 1170, a plurality of washers 1172, a plurality of nuts 1174, and/or a plurality of rivets 1176. For example, the beams 1102 may include mounting portions 1178 that have openings 1180, which may be aligned with corresponding openings 1182 disposed in the support brackets 1104. Accordingly, the plurality of bolts 1170 may extend through the openings 1180 and the corresponding openings 1182 and secure the beams 1102 to the support brackets 1104 by tightening the plurality of nuts 1174 around the plurality of bolts 1170. In some embodiments, the plurality of washers 1172 may be utilized to distribute pressure applied to the beams 1102 and the support brackets 1104 to enhance the connection between the beams 1102 and the support brackets 1104. Further, the plurality of rivets 1176 may be utilized to further secure the beams 1102 to the support brackets 1104.

Figure 9:
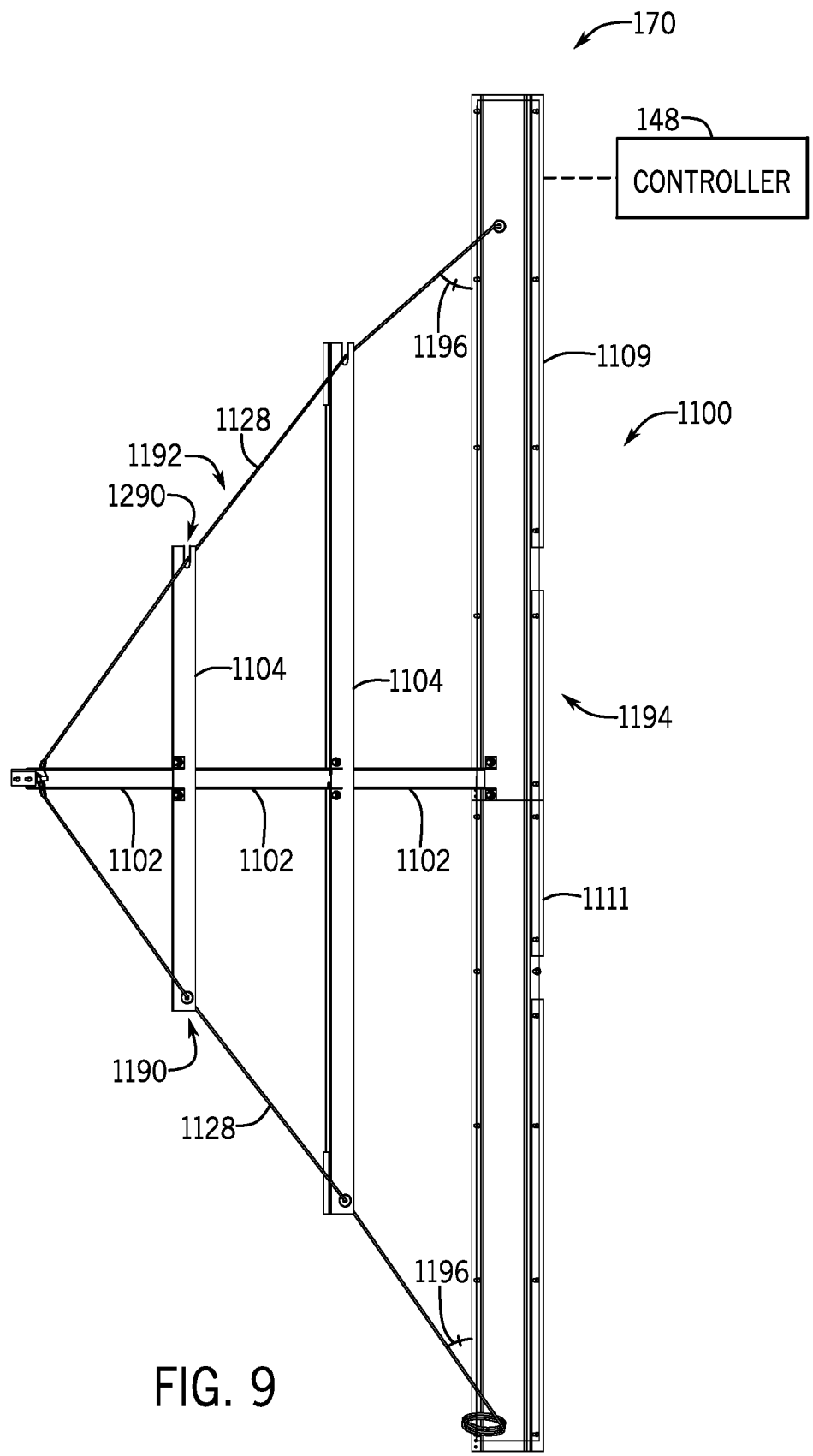
FIG. 9 is an elevation view of an embodiment of the freezestat assembly of FIGS. 7 and 8, in accordance with an aspect of the present disclosure.

FIG. 9 is an elevation view of the assembled freezestat assembly 170. As shown in the illustrated embodiment of FIG. 9, the freezestat assembly 170 forms a generally triangular shape. For example, the tubing 1128 forms a first side 1190 and a second side 1192 of the triangular shape, while the end bracket 1100 forms a third side 1194. In some embodiments, the triangular shape of the freezestat assembly 170 may enhance an ability of the freezestat assembly 170 to monitor a temperature of the fluid flowing through the HVAC unit 12. For example, in the embodiment of FIG. 9, the tubing 1128 forms an angle 1196 with the end bracket 1100, such that the tubing 1128 extends at the angle 1196 along the length 1114 of the evaporator coil 172 and/or the length 1116 of the hot water coil 174. The angle 1196 may enable the tubing 1128 to be exposed to the fluid at various points along a height of the evaporator coil 172 and a height of the hot water coil 174. As such, the freezestat assembly 170 may determine temperature variations throughout the cavity 178 as a result of the tubing 1128 forming the angle 1196 with the end bracket 1100. Thus, the freezestat assembly 170 increases an accuracy of temperature measurements of the fluid through the HVAC unit 12, thereby enhancing an efficiency of the HVAC unit 12.

Figure 10:
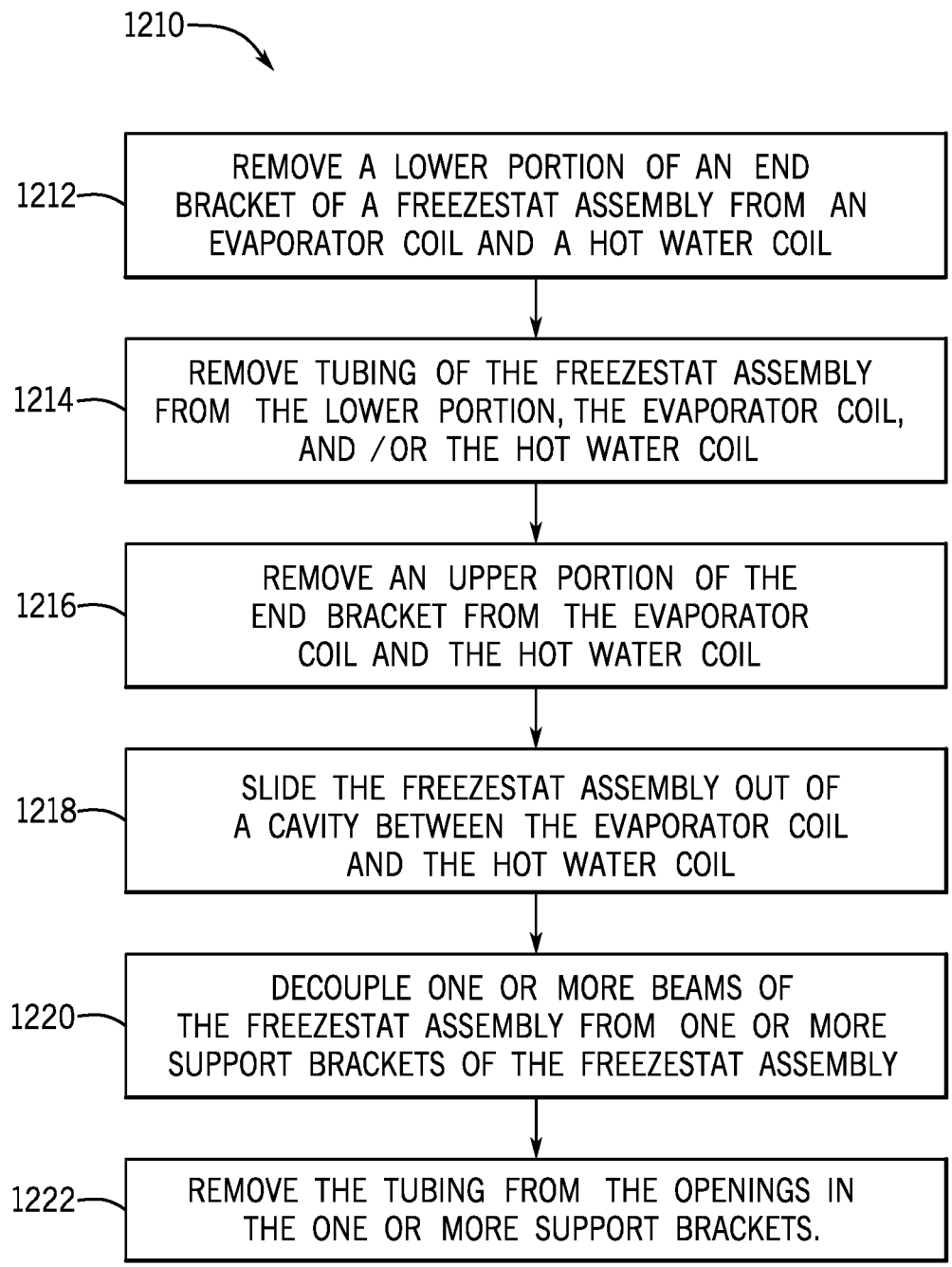
FIG. 10 is a block diagram of an embodiment of a process for removing a tubing of the freezestat assembly from between the evaporator coil and the hot water coil, in accordance with an aspect of the present disclosure.

FIG. 10 is a block diagram of a process 1210 that may be utilized to remove the tubing 1128 of the freezestat assembly 170 and/or another component of the freezestat assembly 170 from the cavity 178. For example, at block 1212, the lower portion 1111 of the end bracket 1100 is removed from the evaporator coil 172 and the hot water coil 174. As discussed above, the fasteners 1158 may be removed from the first column 1152 of the openings 1154 and the second column 1156 of the openings 1154 in the lower portion 1111 of the end bracket 1100. Additionally, at block 1214, the tubing 1128 is removed from the lower portion 1111, the evaporator coil 172, and/or the hot water coil 174. In some embodiments, a first end of the tubing 1128 is coupled to the lower portion 1111 when the freezestat assembly 170 is assembled and installed in the cavity 178 between the evaporator coil 172 and the hot water coil 174. In other embodiments, the first end of the tubing 1128 may be coupled to a portion of the evaporator coil 172 and/or a portion of the hot water coil 174. In still further embodiments, the first end of the tubing 1128 may be coupled to another suitable component, or the first end of the tubing 1128 may not be coupled to a component of the freezestat assembly 170, the evaporator coil 172, and/or the hot water coil 174.

At block 1216, the upper portion 1109 of the end bracket 1100 is removed from the evaporator coil 172 and the hot water coil 174. As discussed above, the fasteners 1158 may be removed from the first column 1152 of the openings 1154 and the second column 1156 of the openings 1154 in the upper portion 1109 of the end bracket 1100. In some embodiments, the freezestat assembly 170 is removable from (e.g., slidable within) the cavity 178 upon removal of the upper portion 1109 from the evaporator coil 172 and the hot water coil 174. For example, at block 1218, the freezestat assembly 170 is slid out from the cavity 178 between the evaporator coil 172 and the hot water coil 174 to provide access to generally all of the freezestat assembly 170 (e.g., the beams 1102, the support brackets 1104, and the tubing 128). Accordingly, at block 1220, the beams 1102 is decoupled (e.g., unsecured, unfastened) from the support brackets 1104 of the freezestat assembly 170. As discussed above, the beams 1102 may be secured to the support brackets 1104 via the plurality of bolts 1170, the plurality of washers 1172, the plurality of nuts 1174, and/or the plurality of rivets 1176. Therefore, such components may be unfastened from one another in order to uncouple the beams 1102 from the support brackets 1104. Uncoupling the beams 1102 from the support brackets 1104 facilitates the removal of the tubing 1128 from the openings 1126 in the support brackets 1104 by reducing a tension applied to the tubing 1128 that may be present when the freezestat assembly 170 is assembled.

Therefore, at block 1222, the tubing 1128 is removed from the openings 1126 of the support beams 1104. For example, the first end of the tubing 1128 may be threaded through each of the openings 1126, such that no portion of the tubing 1128 extends through one of the openings 1126. In some embodiments, the tubing 1128 may be marked (e.g., with a writing instrument and/or another suitable marker) to designate a point along the tubing 1128 representing approximately (e.g., within 10% of, within 5% of, or within 1% of) half a length of the tubing 1128. For example, a halfway point along the length of the tubing 1128 may be disposed in the fastener 1124 that ultimately couples the freezestat assembly 170 to the evaporator coil 172 and/or the hot water coil 174 (e.g., the fastener 1124 rests on a portion of the evaporator coil 172 and/or the hot water coil 174). Marking the halfway point of the tubing 1128 may facilitate installment of a new piece of the tubing 1128 by aligning the new piece of tubing 1128 with the marked tubing 1128 and marking the new piece of the tubing 1128 at substantially the same point.

FIG. 11 is a block diagram of a process 1240 that may be utilized to install the tubing 1128 of the freezestat assembly 170 as well as to install the freezestat assembly 170 in the cavity 178 between the evaporator coil 172 and the hot water coil 174. For example, at block 1242, the tubing 1128 is secured to the fastener 1124. As discussed above, in some embodiments, the tubing 1128 may be marked to signal to an operator a point at which the tubing 1128 may be secured to the fastener 1124. Marking the tubing 1128 may facilitate installation of the tubing 1128 and the freezestat assembly 170, as a whole. Further, at block 1244, the first end of the tubing 1128 is threaded through a first opening of a first support bracket of the support brackets and a second end of the tubing is threaded through a second opening in the first support bracket. The first support bracket is coupled to a first beam of the beams 1102, as shown at block 1246. Coupling the first support bracket to the first beam may apply tension to the tubing 1128, which may block movement of the tubing 1128 with respect to the openings 1126 in the support brackets 1104.

At block 1248, the freezestat assembly 170 is partially slid into the cavity 178 between the evaporator coil 172 and the hot water coil 174. Sliding the freezestat assembly 170 part way into the cavity 178 may enable the tubing 1128 extending from the first and second openings 1126 of the first support bracket to be accessible to an operator. Accordingly, at block 1250, the first end of the tubing 1128 is threaded through a third opening of a second support bracket of the support brackets 1104 and the second end of the tubing 1128 is threaded through a fourth opening of the second support bracket. Additionally, at block 1252, the second support bracket is coupled to a second beam of the beams 1102 to apply further tension to the tubing 1128 and block movement of the tubing 1128 with respect to the third and fourth openings.

Once the second support bracket and the second beam are coupled to one another, the second end of the tubing 1128 may be coupled to the upper portion 1109 of the end bracket 1100, as shown in block 1254. In some embodiments, the second beam is coupled to the upper portion 1109 of the end bracket 1100, as shown at block 1255. Further, as discussed above, the first end of the tubing 1128 may be coupled to the lower portion 1111 of the end bracket 1100, the evaporator coil 172, and/or the hot water coil 174, as shown in block 1256. When the tubing has been secured at both the first end and the second end, the upper portion 1109 and the lower portion 1111 of the end bracket 1100 may be secured to the evaporator coil 172 and the hot water coil 174, as shown at block 1258. Accordingly, the freezestat assembly 170 may be installed between the evaporator coil 172 and the hot water coil 174. Disposing the freezestat assembly 170 between the evaporator coil 172 and the hot water coil 174 may enable the HVAC unit 12 to operate with enhanced efficiency as well as to enable at least the hot water coil 174 to include an increased capacity.

In some embodiments, one end of the tubing 1128 is coupled to the controller 148 when the tubing 1128 is disposed onto the freezestat assembly 170, such that a single end of the tubing 1128 is available to thread the tubing 1128 through the openings of the end bracket 1100, the beams 1102, and/or the support brackets 1104. FIG. 12 is a block diagram of an embodiment of a process 1280 for disposing the tubing 1128 onto the freezestat assembly 170 when an end of the tubing 1128 is coupled to the controller 148 (e.g., the end of the tubing is not removable from the controller 148). For example, at block 1282, a point of the tubing 1128 is marked to determine the point along the tubing 1128 that should be disposed in the fastener 1124. For example, in some embodiments, the point of the tubing 1128 that is marked may be a substantially central point of the tubing 1128, such that an approximately equal amount of the tubing 1128 may extend from the fastener 1124 to the upper portion 1109 of the end bracket 1100 and toward the lower portion 1111 of the end bracket 1100. As such, at block 1284, an end of the tubing 1128 (e.g., the end opposite to an end coupled to the controller 148) is disposed through a first opening of the upper portion 1109 of the end bracket 1100. Additionally, at block 1286, the end of the tubing 1128 is threaded through the fastener 1124 until the marked point of the tubing 1128 is aligned with, or disposed in, the fastener 1124. In some embodiments, the fastener 1124 may be disposed on a first beam 1102 of the plurality of beams 1102.

Accordingly, at block 1288, the first beam 1102 is coupled to a first support bracket 1104 of the plurality of support brackets. In some embodiments, the first support bracket 1104 may have a first slot 1290 (see, e.g., FIG. 9) that receives and supports a portion of the tubing 1128. As such, the tubing 1128 may be disposed in the first slot 1290 when the first support bracket 1104 and first beam 1102 are coupled to one another. Further, at block 1292, the end of the tubing 1128 is threaded into a second opening of the first support bracket 1104 that is disposed on an opposite end of the first support bracket 1104 as the first slot 1290. The freezestat assembly 170 may then be slid partially into the cavity 178 between the evaporator coil 172 and the hot water coil 174, as shown at block 1294. Sliding the freezestat assembly 170 part way into the cavity 178 may enable the tubing 1128 extending from the second opening of the first support bracket 1104 to be accessible to an operator.

In some embodiments, an intermediate beam 1102 of the plurality of beams 1102 is secured to the first support bracket 1104 (e.g., welded and/or otherwise not removably coupled to the first support bracket 1104). Additionally, the intermediate beam 1102 may be secured to a second support bracket 1104 of the plurality of support brackets 1104 (e.g., welded and/or otherwise not removably coupled to the second support bracket 1104). Accordingly, at block 1296, the end of the tubing 1128 is disposed in a third opening of the second support bracket 1104. Further, in some embodiments, the second support bracket 1104 may have a second slot that receives and supports a portion of the tubing 1128. Once the tubing 1128 is secured to the second support bracket 1104, a second beam 1102 of the plurality of beams 1102 is coupled to the second support bracket 1104 and to the upper portion 1109 of the end bracket 1100, as shown at block 1298. The upper portion 1109 of the end bracket 1100 is then coupled to the evaporator coil 172 and/or the hot water coil 174, as shown at block 1300.

The end of the tubing 1128 may then be coupled to the lower portion 1111 of the end bracket 1100, the evaporator coil 172, and/or the hot water coil 174, as shown at block 1302. When the end of the tubing 1128 has been secured, the lower portion 1111 of the end bracket 1100 may be secured to the evaporator coil 172 and the hot water coil 174, as shown at block 1304. Accordingly, the freezestat assembly 170 may be installed between the evaporator coil 172 and the hot water coil 174. Disposing the freezestat assembly 170 between the evaporator coil 172 and the hot water coil 174 may enable the HVAC unit 12 to operate with enhanced efficiency as well as to enable at least the hot water coil 174 to include an increased capacity.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A freezestat assembly, comprising:
    a plurality of support brackets disposed in a linear arrangement, wherein each support bracket of the plurality of support brackets comprises a corresponding aperture; and
    a tubing configured to be disposed in the corresponding aperture of each support bracket of the plurality of support brackets, wherein the tubing is configured to monitor a temperature of a flow of fluid through a heating, ventilating, and air conditioning (HVAC) system, and wherein the freezestat assembly is configured to be disposed upstream of an evaporator coil of the HVAC system and downstream of a hot water coil of the HVAC system with respect to the flow of fluid through the HVAC system.

2. The freezestat assembly of claim 1, wherein the plurality of support brackets comprises an end bracket at a first end of the freezestat assembly, and wherein the end bracket is configured to couple to the evaporator coil and the hot water coil.

3. The freezestat assembly of claim 2, wherein the end bracket comprises an upper portion and a lower portion coupled to the upper portion.

4. The freezestat assembly of claim 2, wherein the plurality of support brackets comprises three support brackets, and wherein the three support brackets each comprise a non-uniform height.

5. The freezestat assembly of claim 4, wherein the non-uniform height of each of the three support brackets gradually decreases from the end bracket along a first length of the evaporator coil and a second length of the hot water coil.

6. The freezestat assembly of claim 2, comprising a fastener disposed at a second end of the freezestat assembly, opposite the first end, wherein the fastener is configured to couple the freezestat assembly to the evaporator coil, the hot water coil, or both.

7. The freezestat assembly of claim 1, comprising a controller coupled to the tubing and configured to receive feedback from the tubing indicative of the temperature of the flow of fluid through the HVAC system.

8. The freezestat assembly of claim 7, wherein the controller is configured to selectively operate the evaporator coil, the hot water coil, or both based on the feedback.

9. The freezestat assembly of claim 1, comprising a beam coupled to the plurality of support brackets and positioned crosswise to the plurality of support brackets, wherein the beam, the plurality of support brackets, or both comprise galvanized sheet metal, stainless steel, plastic, another corrosion resistant material, or a combination thereof.

10. The freezestat assembly of claim 1, comprising a plurality of grommets disposed in the corresponding apertures of the plurality of support brackets, wherein the plurality of grommets is configured to secure the tubing within the corresponding apertures.

11. The freezestat assembly of claim 1, comprising a plurality of trim components disposed on the plurality of support brackets, wherein the plurality of trim components is configured to reduce friction and noise between the tubing and edges of the plurality of support brackets.

12. The freezestat assembly of claim 1, comprising a beam coupled to the plurality of support brackets and positioned crosswise to the plurality of support brackets, wherein the beam comprises three beam sections, wherein each beam section of the three beam sections comprises a uniform length.

13. The freezestat assembly of claim 1, comprising a beam coupled to the plurality of support brackets and positioned crosswise to the plurality of support brackets, wherein the beam comprises a plurality of beam sections, and the plurality of beam sections is coupled to the plurality of support brackets via a plurality of bolts, a plurality of nuts, a plurality of washers, a plurality of rivets, or any combination thereof.

14. A heating, ventilation, and air conditioning (HVAC) unit, comprising:
an evaporator coil configured to absorb thermal energy from an air flow passing through the HVAC unit;
a hot water coil disposed upstream of the evaporator coil with respect to the air flow passing through the HVAC unit, wherein the hot water coil is configured to transfer thermal energy to the air flow passing through the HVAC unit; and
a freezestat assembly disposed upstream of the evaporator coil and downstream of the hot water coil with respect to the air flow, wherein the freezestat assembly comprises:
a plurality of beam sections extending in a first direction;
a plurality of support brackets coupled to the plurality of beam sections and extending a second direction, wherein the second direction is perpendicular to the first direction; and
a tubing disposed in respective openings of the plurality of support brackets, wherein the tubing is configured to monitor a temperature of the air flow passing through the HVAC unit.

15. The HVAC unit of claim 14, wherein the evaporator coil comprises a first length and the hot water coil comprises a second length, and the first and second lengths are equal to one another.

16. The HVAC unit of claim 15, wherein the first length and the second length are equal to a third length of the HVAC unit.

17. The HVAC unit of claim 14, comprising a controller coupled to the tubing and configured to receive feedback from the tubing indicative of the temperature of the air flow passing through the HVAC unit.

18. The HVAC unit of claim 17, wherein the controller is configured to selectively operate the evaporator coil, the hot water coil, or both based at least on the feedback.

19. A heating, ventilation, and air conditioning (HVAC) enclosure, comprising:
an evaporator coil configured to absorb thermal energy from a flow of fluid passing through the HVAC enclosure;
a hot water coil disposed upstream of the evaporator coil with respect to the flow of fluid passing through the HVAC enclosure, wherein the hot water coil is configured to transfer thermal energy to the flow of fluid passing through the HVAC enclosure;
a freezestat assembly disposed upstream of the evaporator coil and downstream of the hot water coil with respect to a direction of flow of the flow of fluid, wherein the freezestat assembly comprises:
a plurality of support brackets disposed in a linear arrangement; and
a freezestat sensor configured to be disposed in respective openings of the plurality of support brackets, wherein the freezestat sensor is configured to monitor a temperature of the flow of fluid passing through the HVAC enclosure; and
a controller coupled to the freezestat sensor and configured to receive feedback indicative of the temperature of the flow of fluid passing through the HVAC enclosure from the freezestat sensor, wherein the controller is configured to selectively control operation of the evaporator, the hot water coil, or both based on the feedback.

20. The HVAC enclosure of claim 19, wherein the controller is configured to actuate the hot water coil when the temperature of the flow of fluid falls below a first threshold.

21. The HVAC enclosure of claim 20, wherein the controller is configured to stop operation of the hot water coil when the temperature of the flow of fluid reaches or exceeds a second threshold.

22. The HVAC enclosure of claim 19, wherein the evaporator coil comprises a first length and the hot water coil comprises a second length, wherein the first length and the second length are equal, and wherein the first length and the second length are equal to a third length of the HVAC enclosure.

23. The HVAC enclosure of claim 19, comprising a beam coupled to the plurality of support brackets and positioned crosswise to the plurality of support brackets, wherein the beam, the plurality of support brackets, or both comprise galvanized sheet metal, stainless steel, plastic, another corrosion resistant material, or a combination thereof.

24. The HVAC enclosure of claim 19, comprising a beam coupled to the plurality of support brackets and positioned crosswise to the plurality of support brackets, wherein the beam comprises a plurality of beam sections, wherein each beam section of the plurality of beam sections comprises a uniform length, and wherein the plurality of beam sections is coupled to the plurality of support brackets.

25. The freezestat assembly of claim 1, wherein a first corresponding aperture of a first support bracket of the plurality of support brackets, a second corresponding aperture of a second support bracket of the plurality of support brackets, and a third corresponding aperture of a third support bracket of the plurality of support brackets are arranged linearly with respect to one another to receive the tubing.

\* \* \* \* \*